United States Patent [19]

Lindstrom

[11] Patent Number: 4,988,885
[45] Date of Patent: Jan. 29, 1991

[54] REMOTE OPTICAL WAVE MEASUREMENT SENSOR

[75] Inventor: Carl E. Lindstrom, N. Stonington, Conn.

[73] Assignee: The United States of America as Represented by the Secretary of the Navy, Washington, D.C.

[21] Appl. No.: 475,562

[22] Filed: Feb. 6, 1990

[51] Int. Cl.$^5$ .................. G01N 15/06; G01W 1/00
[52] U.S. Cl. ............................... 250/560; 250/574; 250/239; 73/170 A
[58] Field of Search ............ 73/170 A; 250/577, 574, 250/227.2 S, 207, 239, 560; 356/381, 382, 436; 340/850

[56] References Cited

U.S. PATENT DOCUMENTS

| | | | |
|---|---|---|---|
| 3,242,836 | 3/1966 | Bartsch | 73/170 A |
| 3,891,859 | 6/1975 | Funk | 73/170 A |
| 3,899,668 | 8/1975 | Tucker, Jr. | 73/170 A |
| 3,983,750 | 10/1976 | Kirkland | 73/170 A |
| 4,677,305 | 6/1987 | Ellinger | 250/577 |
| 4,780,863 | 10/1988 | Schoepf | 73/170 A |

FOREIGN PATENT DOCUMENTS 1251007 8/1986 U.S.S.R. ............ 73/170 A

OTHER PUBLICATIONS

Hughes et al., "A Fast Response Surface-Wave Slope Meter and Measured Wind-Wave Moments", *Deep-Sea Research* vol. 24 No. 12, 12/77, pp. 1211–1223.

Wu et al., "Scanner for Measuring Fine Sea-Surface Structures", Rev. Sci. Instrum. 52(8), 8/81, pp. 1246–1251.

*Primary Examiner*—David C. Nelms
*Assistant Examiner*—Michael Messinger
*Attorney, Agent, or Firm*—Michael J. McGowan; Prithvi C. Lall

[57] ABSTRACT

A submerged small angle field-of-view optical radiometer which can passively measure ocean surface wave heights, characteristics, and statistics remotely. The mechanism involves measurement of a varying underwater radiant light field and correlation of that light field to surface wave heights. The device comprises a passive optical detector, a narrow band optical filter, a small angle field-of-view limiter and associated electronics for power, monitoring and control. The device is housed in a watertight container with an optically transmissive window and is connected to onshore or inboard electronics by a single cable. The cable carries power, monitoring, control and data signals to and from the sensor to the onshore or inboard electronics. The sensor can be bottom mounted on the sea floor or can be mounted on a submerged platform such as a submarine.

11 Claims, 2 Drawing Sheets

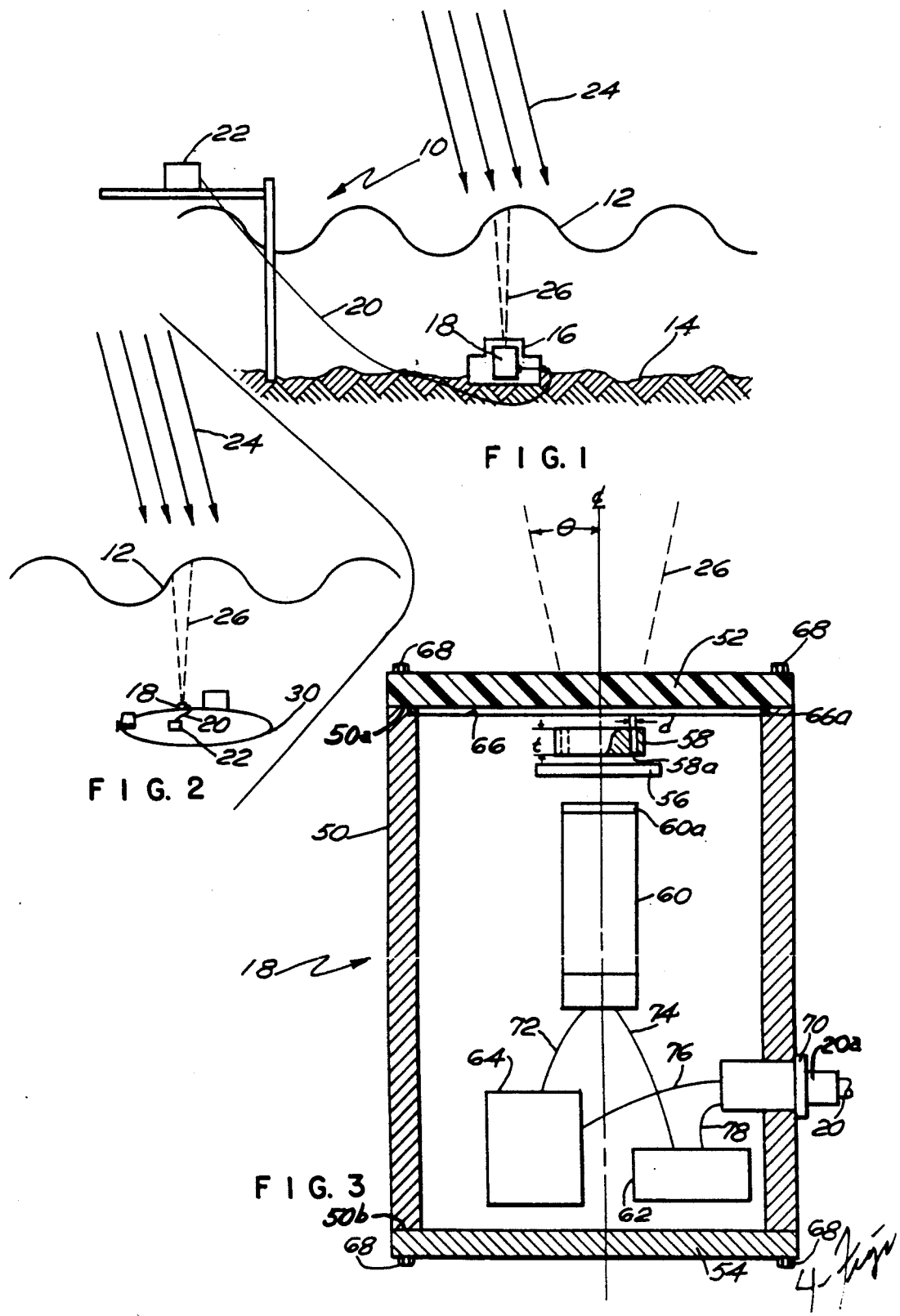

REMOTE OPTICAL WAVE MEASUREMENT SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to ocean wave measurement devices and more specifically to a means for determining realtime ocean wave heights, characteristics, and statistics such as mean wave heights, power spectral densities, and sea state from locations below the sea surface such as on a submerged platform or on the sea bottom.

(2) Description of the Prior Art

Users of ocean wave information are many and varied. Naval architects, ocean engineers and oceanographers frequently measure wave statistics in order to properly design and construct ships, platforms and structures. Meteorologists measure waves as an aid in predicting and studying weather patterns. The U.S. Navy has great interest in measuring surface wave conditions from submerged submarines due to the profound effect that the surface waves have, not only on the decision to launch submarine missiles, but also upon the potential destabilization of the launching submarine itself.

Various methods are currently available for measuring ocean surface wave heights, statistics, and sea surface characteristics from below the ocean surface. Such sensing methods include pressure sensors, acoustic sensors, and tethered accelerometer instrumented buoys. Each sensor is capable of providing wave height data for determining statistics and surface characteristics but each sensor has inherent practical limitations such that its use may be inappropriate for given applications. For example, pressure sensors cannot generally be used at depths greater than 20 meters below the sea surface. Acoustic sensors are not used very often because naturally occurring variations in ocean temperature and salinity affect the speed of sound in sea water and hence the calibrated accuracy of the acoustic sensor. Tethered buoys launched from U.S. Navy submarines, such as the one described in U.S. Pat. No. 4,794,575, can be used to measure surface wave conditions but tend to increase the risk of submarine counterdetection by hostile forces. In addition, tethered buoys can limit submarine operating capabilities by placing restrictions on permissible submarine speed and depth for the period during which the buoy is deployed.

During recent U.S. Navy submarine underwater missile launching exercises, failures have occurred that have been directly attributed to the destabilization of the missile and the launching platform by large ocean surface waves, i. e., high sea state. Due to the adverse effects of these large surface waves on the missile and the launch platform, a principal criteria for arriving at a launch decision is the maximum sea-state launch design limit of the missile in relation to the actual sea-state conditions present at the time of launch. Currently the submarine commander is required to make critical sea-state estimates using one or both of two methods presently available to him. These methods comprise either periscope observations of short duration or second party observation reports received via communication link. Both of the methods have drawbacks but the most significant problem is that for each case the submarine is required to approach the surface to periscope depth. This greatly increases the risk of counterdetection by hostile forces. There is currently no objective, reliable, and covert method by which a submarine can determine the required real-time sea-state conditions prior to launch of sea-state limited missiles. What is needed is a covert sensor.

SUMMARY OF THE INVENTION

It is a general purpose and object of the present invention to provide a means of directly measuring sea surface wave heights, characteristics, and statistics from a fixed submerged device or a submerged submarine.

It is a further object to provide such a wave height measurement capability passively, i.e., without generating any optical or acoustic transmissions.

Another object is that the invention have physical size and dimensions such that mounting it on a submerged platform such as a submarine will not cause any interference with existing sensors or appendages and which can be flush mounted such that no additional flow noise or turbulence is created when underway. Still another object is that the invention be capable of surviving and functioning at all submarine operational speeds and depths.

These objects are accomplished with the present invention by providing a passive, narrow field-of-view, optical radiometer which can be bottom mounted on a fixed submerged platform or hull mounted on a submarine. The invention measures sea surface wave heights, characteristics, and statistics for a broad range of applications including scientific data gathering, weather forecasting and missile pre-launch sea state determination. The device comprises an enclosed cylindrical metal shell with one end having an optically transparent widow. The shell houses an optical detector, a narrow band optical filter, a field-of-view limiter, and the electronics required to supply power to the detector, monitor the status of the detector, and amplify and transfer the signals from the device to inboard or shore based control and data acquisition units via a connecting cable.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 shows the sensing device of the present invention, platform mounted on the ocean bottom;

FIG. 2 shows the sensing device of the present invention mounted on a submerged submarine;

FIG. 3 shows a cross sectional view of the sensing device of FIGS. 1 and 2; and

DESCRIPTION OF THE PREFERRED EMBODIMENT

Figure 4:
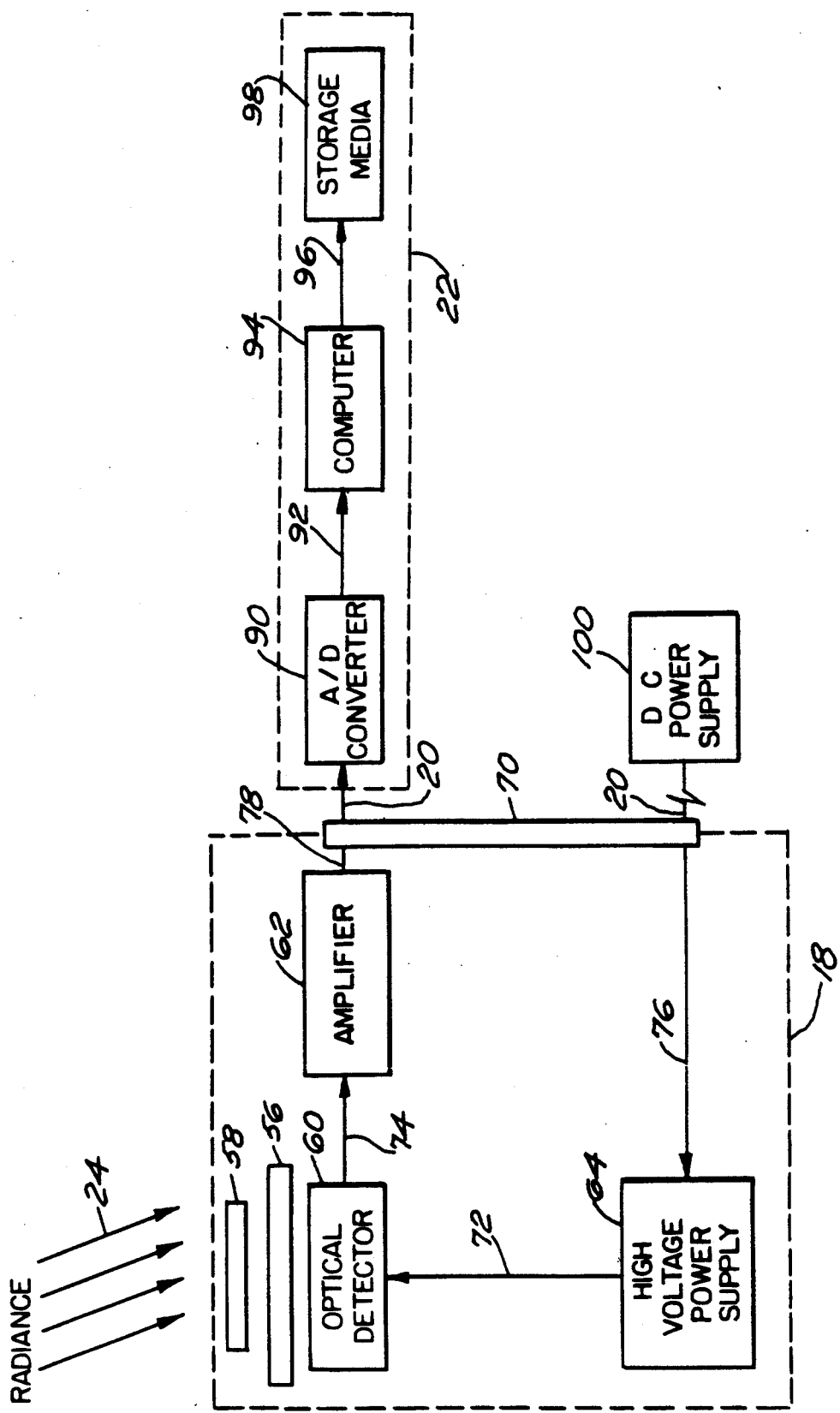
FIG. 4 shows a block diagram of the major system components of the device of FIG. 3.

Referring now to FIG. 1 there is shown a means 10 for directly measuring sea surface 12 wave heights, characteristics, and statistics from a bottom (14) mounted platform 16 using a passive, narrow field-of-view radiometer 18. Data signals are transmitted from device 18 via a lead wire 20 to shore based control, data collection and display equipment, represented generally as 22, for real-time data presentation or subsequent signal processing. Sea surface 12 is shown to be illuminated by a radiant light source 24 which may be natural or artificial. The narrow field of view volume 26 encompassed by device 18 is substantially a tapered cone. Only that portion of light 24 that travels within conical volume 26 reaches device 18.

FIG. 2 shows a means for accomplishing the same type of wave measurements using device 18 from a submerged submarine 30 with the control, data collection, and display equipments 22 being located inboard with lead wire 20 connecting device 18 to equipment 22. This application of device 18 provides passive optical determination of surface sea state conditions prior to a submarine missile launch.

The shape and motion of the ocean surface 12 as waves pass across it are very complicated. Waves in the sea do not have regular and precise properties. Sea surface 12, which represents the air-water boundary, is often represented by a summation of nearly sinusoidal waves travelling in different directions and having varying individual wavelengths with corresponding periods, amplitudes, and phases. The need to describe and catalog wave observations led to the definition of a "significant wave height" parameter. Significant wave height is defined as the average of the highest one-third of the waves and is one of the statistics that is commonly measured and recorded by oceanographers, engineers, and scientists.

The forces that generate waves, such as storms, tides, and winds, impart energy which produce motion that is generally restricted to unique frequency bands. For example, wind waves generally have their power restricted to frequencies between one tenth and five Hertz as shown by G. Pickard and S. Pond in *Introductory Dynamical Oceanography*, pp 207-210, Pergamon Press, N.Y., Second Edition, 1983. Spectral analysis of ocean wave data is commonly used today to determine the distribution of wave energy as a function of frequency. Power spectral density functions are estimated directly from ocean wave time series data measurements using the Fast Fourier Transform (FFT) method. FFT spectrums can be derived from segments of wave amplitude data. Ensemble and frequency averages can then be used to develop a single statistically accurate spectrum. Commercial software packages can be purchased to run on microcomputers which routinely calculate FFT's from sampled wave height records. The FFT's can be used to determine power spectral density functions for use in scientific data analysis, weather and wave forecasting, and missile pre-launch sea state determination.

Light 24 that is incident on air-water boundary 12 is partially transmitted and partially reflected. The light that is transmitted into the water will undergo attenuation due primarily to absorption and scattering. When a narrow field-of-view optical detector is positioned a preselected depth below surface 12 the amount of radiance that arrives at the detector will be mainly a function of the water path absorption and scattering losses, the incident radiance at air-water boundary 12, and the length of the water path from air-water boundary 12 to the detector. With respect to wave height variations, surface radiance and water path scattering and absorption losses will in general remain relatively constant for a given location in the ocean. Here surface radiance, and water path scattering and absorption losses are assumed to remain constant. Therefore, radiance variations observed at submerged detector 18 will be a direct result of water path length variations. Obviously, surface radiance does not always remain constant and water path scattering and absorption can vary for a given location. The frequency of those variations, however, will be slow with respect to surface wave variations. If the detector maintains a fixed location below air-water boundary 12 then the radiance variations observed by the detector are a direct result of wave height variations. Wave measurements can then be made directly using the radiance sensor once the proper calibration techniques have been employed to convert underwater radiance to wave heights and filtering is then used to suppress those slower components attributable to surface variations, scattering and absorption variations.

Passive optical radiometer sensor 18 can measure wave heights, wave characteristics, and statistics from a remote submerged location. It can passively provide a researcher, engineer, or meteorologist with measurements of ocean wave amplitude records from a remote platform located below the ocean surface as shown in FIG. 1. It can also provide a submarine with the capability to passively determine overhead wave conditions from well below the ocean surface and acquire wave amplitude records as shown in FIG. 2. Device 18 can provide submarine 30 with such capabilities without compromising covertness of the submarine or restricting operating speed or depth capabilities.

Device 18, shown in more detail in FIG. 3, comprises a cylindrical metal shell 50 with an optically transparent window 2 of acrylic or the like fixedly attached to a first end face 50a and a steel plate 54 fixedly attached to a second end face 50b. The resulting enclosed shell houses an optical narrowband filter 56, a field-of-view limiter 58, an optical detector 60, an electronic amplifier package 62, and an electronic high voltage power supply 64. Shell 50 is preferably made of steel and has a circular O-ring groove 66 into first end face 50a. Window 52 is seated against an O-ring 66a that is disposed in groove 66 and is attached to metal shell 50 with a plurality of threaded fasteners 68 such as socket head cap screws or the like. An epoxy molded connector 70 passes through an aperture in the wall of and is attached to shell 50. Connector 70 is female and when mated to the male end 20a of attaching cable 20 a watertight seal is formed. Field-of-view limiter 58 is a circular metal plate having a preselected thickness "t" and a plurality of closely spaced holes 58a of preselected diameter "d" passing therethrough such that the ratio of plate thickness "t" to hole diameter "d" allows for a desired optical field of view 26 of preselected angle $\theta$. Optical filter 56 is an interference type, bandpass filter that is best described as a Fabry-Perot cavity comprising two partially reflective metallic layers separated by a transparent dielectric spacer layer. The thickness of the dielectric layer is such that peak transmission occurs only at the desired wavelength. Optical detector 60 is a photomultiplier type and works as follows. Light having a certain wavelength enters the narrow field-of-view of sensor 18 and impinges on the photocathode 60a of photomultiplier 60. The photocathode emits photoelectrons in proportion to the intensity of the impinging light. The photoelectrons are amplified by a well known dynode chain (not shown) to produce a current.

That current is then converted in photomultiplier 60 into an output voltage which is transmitted as a signal voltage. Radiance sensor 18 has a linear response for signals below 5 Hertz. Field-of-view limiter 58, narrow band filter 56 and optical detector 60 respectively are mounted within device 18 such that they align with the device centerline as shown. The internal electronic components, shown in FIG. 3 in block form, comprise a high voltage power supply 64 for providing current to photocathode 60a via lead 72, logarithmic amplifiers 62 for receiving via lead 74 the signal compression output, and miscellaneous monitoring and control circuitry. Power supply 64 receives power from a DC supply via connector 70 and lead 76. Amplifier package 62 transmits its output signal to 22 via lead 78. All the internal electronics are standard off-the-shelf devices and may be positioned and mounted internally as desired as long as such mounting does not interfere with the positioning and location of units 56, 58 and 60.

FIG. 4 shows a block diagram of the internal components of device 18 together with the interconnection links with shore based or inboard power, data readout and acquisition equipment. Output signals from optical detector 60 are routed via logarithmic amplifier 62 through epoxy molded connector 70 to control and monitoring equipment 22 which may be located ashore or onboard the submarine using commercially available electrical cable. The signal is then transmitted via leads in cable 20 to an analog-to-digital converter 90, then through a lead 92 to a digital computer 94. The output of computer 94 next is transmitted through lead 96 for real time analysis or storage on media 98. Power is supplied to device 18 from a DC power supply 100 through lead 76 which connects to high voltage power supply 64. Signal processing software operating on computer 94 is then used to determine power spectral density information.

The advantages of the present invention over the prior art are that: The submerged optical radiometer method provides a novel approach for measuring sea surface conditions from a fixed submerged platform or from a submarine. The device provides significant advantages over prior art methods. First, it allows for ocean wave height and statistics measurements to be made remotely from below the ocean surface without exposing any above water components that could be accidentally or purposely damaged or counterdetected by surface ships or aircraft. Second, it allows for the real-time measurement of sea surface conditions through passive means without generating any active transmissions which could make a submerged platform or submarine more vulnerable to attack or counterdetection. Third, the passive nature of the device allows for relatively low power applications as opposed to using high power acoustic transmitters or lasers. Fourth, the device allows a submarine to monitor sea surface conditions while at operational depth.

What has thus been described is a passive optical radiometer type sensor that measures wave heights, wave characteristics, and statistics from a remote submerged location. It passively provides measurements of ocean wave amplitude recorded from a remote platform located below the ocean surface. The device also provides a submarine with the capability of passively determining overhead wave conditions from well below the ocean surface and acquiring wave amplitude records. It provides the submarine with those capabilities without compromising the covertness of the submarine or restricting ship's speed or depth capabilities. The device comprises a cylindrical metal shell with an acrylic window at one end housing an optical narrowband filter, a field-of-view limiter, an optical detector and an electronic package. The signals are routed from the logarithmic amplifiers through the epoxy molded connector to the control and monitoring box located ashore or inboard by standard electrical cable. The signal is then routed to an analog-to-digital converter and to a digital computer for real time analysis or storage. Signal processing software can be used to determine power spectral density information.

Obviously many modifications and variations of the present invention may become apparent in light of the above teachings. For example: a solid state detector may be used in place of the photomultiplier 60, linear amplifiers may be used in place of logarithmic amplifier 62 described above, a glass window could replace the acrylic window 52, the optical transmission window of bandpass filter 56 could be changed, or the field-of-view limiter 58 of the device could be varied. Signal processing software and statistical software packages can be modified as appropriate to achieve maximum speed and accuracy.

In light of the above, it is therefore understood that within the scope of the appended claims, the invention may be practiced otherwise than as specifically described.

What is claimed is:

1. An apparatus for remotely measuring ocean surface wave characteristics, comprising:

a light source, positioned above said ocean surface, for illuminating said ocean surface with radiant light;

sensing device means, being mounted on a platform under the surface of said ocean, for receiving a small preselected angle $\theta$, narrow-field-of-view, portion of said radiant light that has traversed through said ocean to said sensing device means from the surface thereof, said radiant light having been modulated in direct proportion to said surface wave characteristics, said sensing device means then converting said modulated narrow-field-of-view light signals to corresponding proportional analog electrical data output signals;

a transmission cable, having first and second ends, said first cable end being electrically connected to said sensing device means, for providing a DC power path to said sensing device means and receiving said proportional analog electrical data output signals therefrom;

DC power supply means, electrically connected to said second cable end, for providing DC power to said sensing device means through said transmission cable; and p1 data acquisition means, electrically connected to said second cable end and disposed at a location remote from said submerged sensing means, for receiving, processing and storing said proportional analog electrical data output signals from said sensing device means, said processed electrical signal containing said desired ocean surface wave characteristics.

2. An apparatus according to claim 1 wherein said sensing device means further comprises:

a sealed cylindrical enclosure means, adapted to permit transmission of said surface wave modulated narrow-field-of-view radiant light therewithin;

narrow-field-of-view limitation means, positioned within said sealed enclosure means such that only light approaching from narrow angles is permitted to pass into said enclosure means;

optical band pass filtering means, positioned within said enclosure means such that only the light that falls within a preselected bandwidth is transmitted therethrough to the optical detector; and instrumentation means, fixedly attached within said sealed cylindrical enclosure means, for receiving said surface wave motion modulated narrow-field-of-view radiant light from said optical band pass filtering means and producing said analog electrical data output signals therefrom, said analog electrical signals then being transmitted over said transmission cable.

3. An apparatus according to claim 2 wherein said data acquisition means further comprises:

an analog-to-digital converter, connected to said second transmission cable end, for receiving said analog data signals from said cable and converting said analog signals to corresponding digital signals;

a general purpose digital computer, electrically connected to said analog-to-digital converter and operating under control of preselected signal processing software, for processing said digital signals received from said analog-to-digital converter in such a way as to produce said wave characteristics; and storage means, connected to said digital computer, for receiving and storing said ocean surface wave characteristics data.

4. An apparatus according to claim 3 wherein said sealed cylindrical enclosure means further comprises:

a cylindrical metal shell, having a cylindrical wall and first and second end surfaces;

a circular metal end plate, fixedly attached to said first end of said shell, for providing a water tight seal for said first shell end;

an optically transparent circular window, fixedly attached to said second end of said shell, for providing an entry path for said narrow-field-of-view light to pass through;

an O-ring seal, disposed between said circular window and said second end of said shell, for providing a water tight seal for said second shell end; and an electrical connector, fixedly attached through said cylindrical wall of said shell, for providing a connection for said transmission cable.

5. An apparatus according to claim 4 wherein said instrumentation means further comprises:

an optical detector for converting said filtered narrow-field-of-view light to said analog electrical signals;

a high voltage power supply, electrically connected to said DC power supply and to said optical detector, for providing operating power thereto; and an electrical amplifier, electrically connected to said optical detector and to said data acquisition means via said electrical connector, for amplifying said analog electrical signals from said optical detector prior to transmission through said electrical connector.

6. An apparatus according to claim 5 wherein said electrical amplifier is of a linear type.

7. An apparatus according to claim 5 wherein said electrical amplifier is of a logarithmic type.

8. An apparatus according to claim 6 wherein said optical detector is of a tube type.

9. An apparatus according to claim 6 wherein said optical detector is of a solid state type.

10. An apparatus according to claim 7 wherein said optical detector is of a tube type.

11. An apparatus according to claim 7 wherein said optical detector is of a solid state type.

* * * * *